United States Patent
Bladon et al.

(10) Patent No.: US 8,091,230 B2
(45) Date of Patent: Jan. 10, 2012

(54) METHOD AND APPARATUS FOR THE MANUFACTURE OF FANS, TURBINES AND GUIDE VANES

(75) Inventors: Christopher George Bladon, Ellesmere (GB); Paul Douglas Bladon, Ellesmere (GB)

(73) Assignee: Bladon Jets Limited, Shropshire (GB)

( * ) Notice: Subject to any disclaimer, the term of this patent is extended or adjusted under 35 U.S.C. 154(b) by 1249 days.

(21) Appl. No.: 11/716,419

(22) Filed: Mar. 9, 2007

(65) Prior Publication Data
US 2007/0271785 A1    Nov. 29, 2007

Related U.S. Application Data

(63) Continuation of application No. PCT/GB2005/003491, filed on Sep. 9, 2005, and a continuation-in-part of application No. 10/546,884, filed on Aug. 24, 2006.

(51) Int. Cl.
*B23P 15/04* (2006.01)
(52) U.S. Cl. .................................................. 29/889.23
(58) Field of Classification Search ............... 29/889.23, 29/557, 889.4, 889.6, 889.7; 700/162
See application file for complete search history.

(56) References Cited

U.S. PATENT DOCUMENTS

| | | | |
|---|---|---|---|
| 2002/0139677 A1* | 10/2002 | Golecki | 204/640 |
| 2003/0024825 A1* | 2/2003 | Lamphere et al. | 205/640 |
| 2003/0080094 A1* | 5/2003 | Imai et al. | 219/69.11 |
| 2006/0157234 A1* | 7/2006 | Golecki | 165/170 |

FOREIGN PATENT DOCUMENTS

| | | |
|---|---|---|
| EP | 0 426 233 | 5/1991 |
| EP | 1 211 009 | 6/2002 |
| EP | 1 433 557 | 6/2004 |
| JP | S51-014147 A | 2/1976 |
| JP | H01-222820 A | 6/1989 |
| JP | H03-184726 A | 12/1991 |
| JP | 06 320346 A | 11/1994 |
| WO | WO 2004/076111 | 9/2004 |

* cited by examiner

*Primary Examiner* — David Bryant
*Assistant Examiner* — Moshe Wilensky
(74) *Attorney, Agent, or Firm* — Ober, Kaler, Grimes & Shriver; Royal W. Craig

(57) ABSTRACT

A method and apparatus for forming a closely spaced radial array of overlapping twisted airfoil blades or vanes. The apparatus comprises an electro-discharge machine that articulates an electrode (150), electrode (150) being in the form of an elongate and substantially rigid (non-wire) curved element which is turned by a tool holder (130) as it is advanced on a helical path. As the electrode (150) is advanced toward the edge surface of the blank it forms the inner surface of each airfoil blade with its outer curve, and forms the outer surface of each airfoil blade with its inner curve. As the electrode (150) is advanced through the blank it is twisted to give the first groove a helical form, thereby forming a twisted airfoil blade.

27 Claims, 10 Drawing Sheets

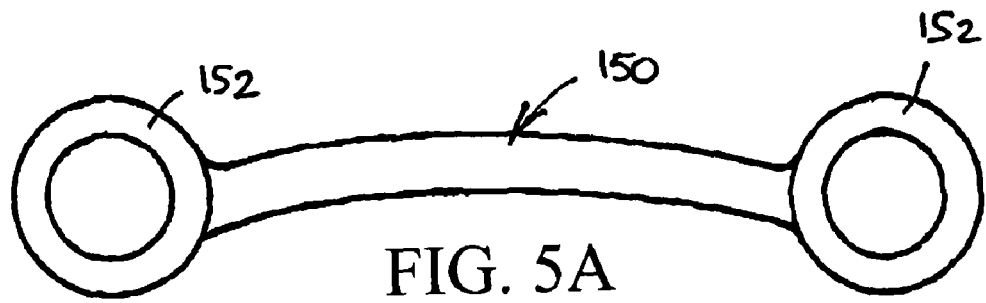
FIG. 5A
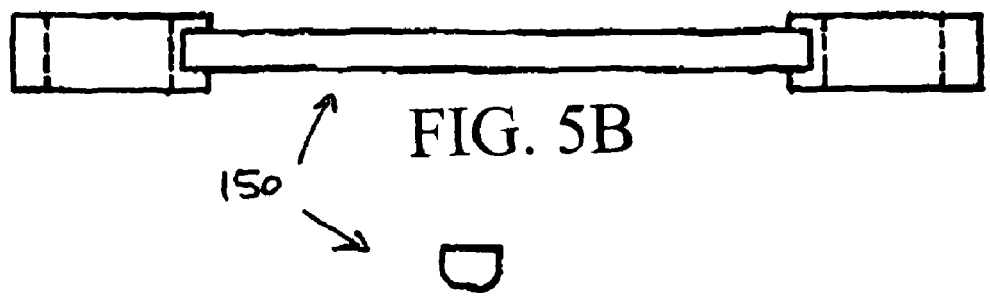
FIG. 5B
FIG. 5C
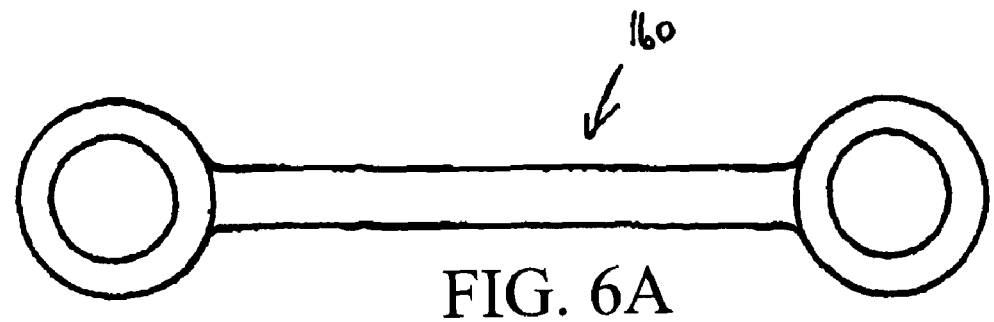
FIG. 6A
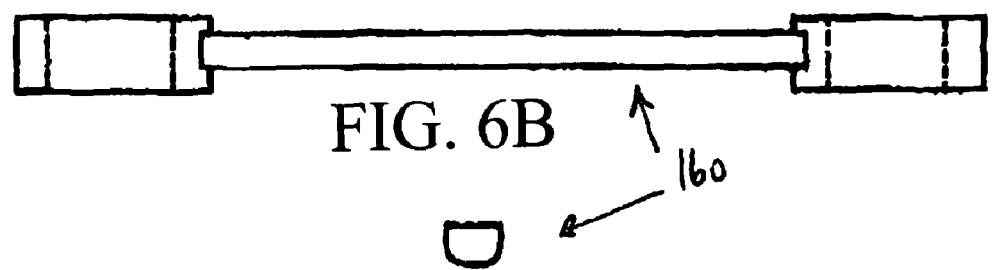
FIG. 6B
FIG. 6C

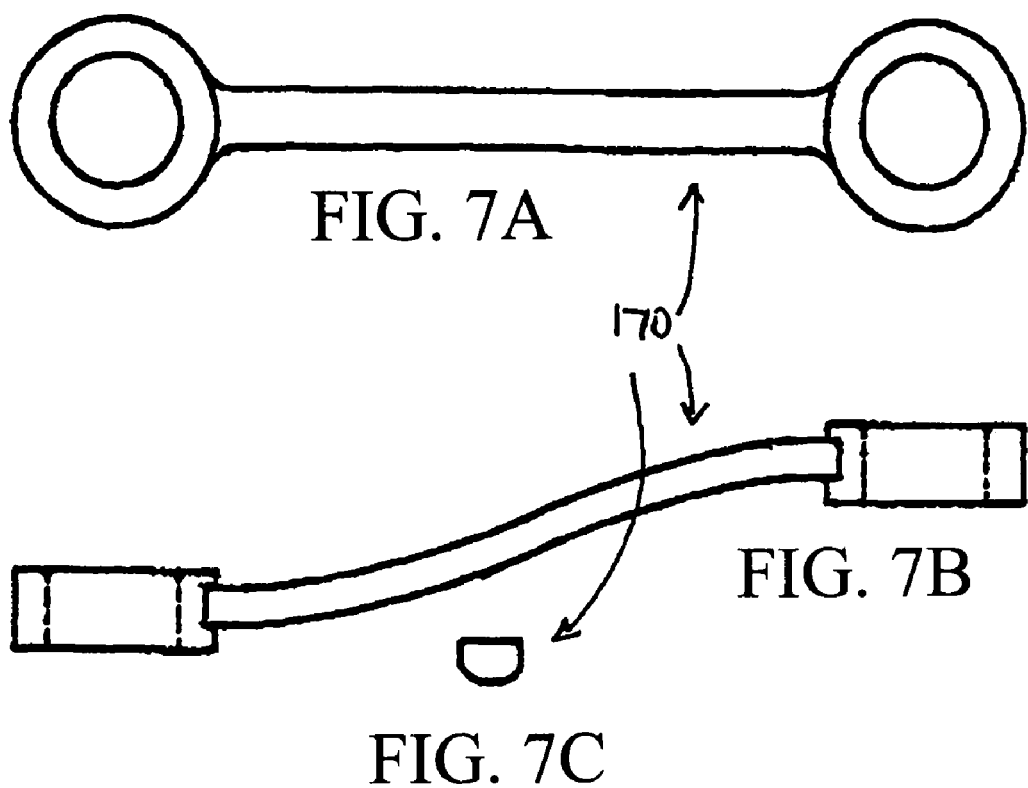

METHOD AND APPARATUS FOR THE MANUFACTURE OF FANS, TURBINES AND GUIDE VANES

CROSS-REFERENCE TO RELATED APPLICATION(S)

The present application is a continuation of International Application PCT/GB2005/03491, with an international filing date of 9 Sep. 2005, and is a continuation-in-part of co-pending U.S. application Ser. No. 10/546,884 filed on 24 Aug. 2006.

BACKGROUND OF THE INVENTION (1) Field of the Invention

The present invention relates to a process, method and apparatus, with particular reference to the manufacture of fans and turbines (for dynamic interaction with fluid flows) and guide vanes (for static interaction with fluid flows), especially for use in turbomolecular pumps and in gas turbine engines.

(2) Description of Prior Art

Gas turbine engines are a widely used form of internal combustion engine and are in many senses more efficient than reciprocating engines operating on the two- or four-stroke principle. In particular, for a given size, the gas turbine can give a higher power output.

Much gas turbine development has concentrated on relatively large power plants for large power outputs, exemplified by turbojet and turbofan engines for aeronautical use. In scaling down the size of such engines, engineering problems are met as dimensions decrease. Some of these problems are to do with the difficulties of further miniaturisation at a manufacturing level, and some to do with the behaviours of gas flows in relatively small spaces.

The present invention addresses aspects of gas turbine engine construction that are particularly applicable to very small gas turbines. Such engines are exemplified by a particular embodiment given as an example herein, where the invention is applied to the manufacture of components for a turbojet engine with an overall diameter of about 10 cm and length of about 32 cm, developing 110N (27 lb) of thrust at an engine speed of 90,000 rpm.

In the general form of a gas turbine, a rotary compressor raises the pressure of intake air, at least some of the air is passed to a combustion chamber or chambers where fuel is burned, exhaust gases drive a turbine as they pass to an exhaust nozzle, and the turbine drives the compressor by an engine shaft.

Gas flow through the engine is highly influenced by a number of static and moving surfaces, typically including fan blades on the successive rotating discs of a multistage axial compressor, stator vanes between each pair of adjacent discs and after the last disc, static nozzle guide vanes between the combustion chamber and turbine, and the rotating turbine blades.

The vanes and blades are likely to be of aerofoil cross section. They are arranged in a substantially radial alignment (as in the spokes of a wheel). The velocity of the axial gas flow through the engine changes from one axial location to the next. At any given axial location in the compressor or turbine section of the engine, the axial gas velocity is intended to be substantially uniform across the diameter of the engine. Since, in the case of rotary fans and turbines, the outer tips of the blades are moving much faster than their inner roots, and because of centrifugal effects, the blades on rotary components are designed to compensate. The blade section changes with radial distance from the centre. Typically, the blades appear twisted along their length, with the least stagger angle at the root and the greatest stagger angle at the tip.

These vanes and blades are conventionally made by casting or machining each blade out of a suitable strong and heat resistant metal alloy. After each individual blade is made, it must be fixed into position on a suitable compressor or turbine hub. This process requires suitable connecting means for making connections between the adjacent parts. In a smaller engine, more precision is required in such means, because any misalignments will be proportionally more significant. The connecting means should be strong, but light in weight. Bonding techniques are used in some cases to attach cast turbine blades to a central rotary disc. In the case of rotary blade discs, a balancing operation will be necessary after assembly.

In the case of a very small engine, a disc might be cast with integral blades, but there are serious problems due to the proximity of adjacent blades, and their twisted forms. While the casting operation as such is technically feasible, the construction of the pattern is exceedingly difficult, and might almost be considered impossible, to construct and use a jig to achieve correct and uniform blade angles, radii and spacings and the like.

In the example of a miniature jet engine given above, the compressor and turbine discs, including blades, may be about 8 cm in diameter, blade tip to blade tip, carrying between 24 and 40 closely spaced thin aerofoil blades, whose chord lengths and stagger angles vary over the lengths of the blades to result in substantial overlap between neighboring blades both axially and radially. The problem of constructing such bladed discs has for a long time been intractable.

In accordance with the disclosure of our patent application PCT/GB2004/000774, published as WO2004/076111, the problem of accurately forming a closely spaced radial array of overlapping shaped blades or vanes, particularly for use in an axial compressor or turbine in a gas turbine engine, and especially in a miniature gas turbine engine, is addressed by removing material from a solid blank to leave the blades or vanes upstanding as the residual material of the blank, removal being effected by a change of state of the material induced by proximity to an advancing tool, the tool being in the form of a shaped wire, and the tool turning as it advances, whereby to generate a surface of a said shaped blade or vane.

We have now devised further improvements in the invention disclosed in our said application WO2004/076111.

Our previous application disclosed a tool for removing material from a workpiece blank, such tool being in the form of a shaped wire. In the case where electro-discharge machining, also known as spark erosion, is the method of removing the material, our previous application discloses the use of a wire tool electrode, and specifically a shaped wire tool electrode.

SUMMARY OF THE INVENTION

In accordance with the present invention, the tool may be in other forms than the form of a wire.

Without attempting to define or limit the ambit of the term "wire" in our previous application, the present invention provides a method, process and apparatus corresponding to those disclosed in that previous application, wherein the tool is in the form of an elongate and substantially rigid element other than a wire. Such a tool is hereinafter referred to as a non-wire tool, and by "non-wire" in this specification we mean "other than wire", where "wire" has an identical meaning in this application and in our application PCT/GB2004/000774.

For the purpose of forming rings of compressor blades or turbine fans, we use electro-discharge machining (EDM), also known as spark erosion, using a turning non-wire tool electrode, as one practical material removal method at the present time. An alternative method is electrochemical machining (ECM). However, other methods may be developed, using another source of intense local heating than an electric discharge, or a different change of state mechanism than EDM or ECM, that provide viable alternatives.

In a more specific aspect, the invention comprises a process for forming, in the body of a workpiece blank having a thickness across an edge surface, a row of twisted aerofoil blades extending towards the said edge, comprising holding a shaped non-wire electrode in a holder, positioning the holder to orient the electrode across the thickness of the edge surface, advancing the electrode towards the edge surface of the blank, causing a high tension discharge between the electrode and the workpiece blank whereby to erode portions of the workpiece ahead of the tool electrode and thereby form a first groove across the edge of the blank, advancing the tool into the groove to deepen the first groove, and turning the tool holder during said advance to give the first groove a helical form; and forming second and further similar adjacent grooves in the workpiece blank in a similar manner whereby the residual workpiece body between pairs of adjacent grooves has the form of a twisted aerofoil blade.

As soon as the advancing tool holder has turned by more than a very small angle, the electrode will start to undercut the workpiece body destined to form the next adjacent blade. This allows the adjacent blades to be closely spaced, and to overlap when viewed in the direction of advance of the tool.

In a preferred application, the invention is used for forming, from a blank disc-like workpiece having a thickness across a circumferential edge surface, a hub carrying a plurality of radial twisted aerofoil blades, by advancing the tool holder radially inwardly when forming each groove. The blades may thus overlap when viewed radially of the hub, and also when viewed axially of the hub.

The invention also provides apparatus for forming a closely spaced radial array of overlapping shaped blades or vanes, comprising means for advancing a shaped non-wire tool towards a solid blank to remove material therefrom by a change of state of the material induced by proximity to the advancing tool, whereby to leave blades or vanes upstanding as the residual material of the blank, and means for turning the tool as it advances, whereby to generate a surface of a said shaped blade or vane.

More particularly, the invention provides apparatus for forming, in the body of a workpiece blank having a thickness across an edge surface, a row of twisted aerofoil blades extending towards the said edge, comprising an elongate non-wire electrode held in a holder, positioning means for orienting the elongate electrode across the thickness of the edge surface, means for advancing the electrode towards the edge surface of the blank, means for causing a high tension discharge between the electrode and the workpiece blank whereby to erode portions of the workpiece ahead of the tool electrode and thereby form a first groove across the edge of the blank, means for advancing the tool into the groove to deepen the first groove, and means for turning the tool holder during said advance to give the first groove a helical form.

It is to be understood that movements of the electrode and of the workpiece described herein, and the movements of their respective holders or mountings, are relative movements. Thus, advancing the tool into the workpiece is equivalent to advancing the workpiece over the tool, turning the tool is equivalent to turning the workpiece, and so on. It is simply a matter of convenience whether either is held stationary relative to any further reference point.

Preferably there is also provided indexing means for indexing the workpiece blank through a sequence of positions at which successive deep helical grooves may be formed by the electrode. There will also normally be provided means for retracting the electrode along its advancement path in order to withdraw it from each formed groove, to permit the workpiece to be indexed to its next position or moved for any other purpose.

Means may also be provided for moving the workpiece or the electrode holder laterally during advance of the elongate electrode into the groove, so that the groove is formed at a slight incline. Such lateral movement may be entirely linear, or rotary, or a combination. In this way, a blade can be formed between two oppositely inclined grooves, so that it is slightly tapered, being marginally thicker at its base than at its tip. This is a more efficient weight and bulk distribution in a turbine or compressor blade than a constant cross section throughout the blade length.

Means may also be provided for tilting the workpiece or the electrode holder, whereby to adjust the inclination of the elongate electrode relative to the workpiece, and hence to adjust the inclination of the groove being formed in the workpiece.

The product of the process and apparatus is typically a compressor disc, or turbine disc, comprising a hub carrying radially outwardly directed twisted aerofoil blades, for rotation at high speed in a gas turbine engine; or a turbine guide vane disc or the like, which may be of similar appearance, but is static in the engine. However it should be noted that even in the case of radial blades or vanes, variations are possible. For example, instead of having an inner hub and outwardly extending blades, the disc may have a continuous outer rim, from which blades extend radially inwardly towards a vacant centre. Such blades may be formed in accordance with the invention by advancing the elongate tool electrode radially outwardly from an apertured centre towards the rim. This is an arrangement that may be chosen for manufacturing discs of compressor stator vanes, to be located between the rotors of the successive stages of a multistage axial flow compressor.

The shaped electrode is so called because its shape, together with its orientation in its holder, and the chosen relation between the advance and the rotation of the holder, are the principal influences on the final shape of the blade contour generated by its motion. However, other motions of the electrode and the workpiece may be introduced. These may be rotary motions about other axes, or rectilinear motions in any chosen direction, or combinations of these, or other more complex motions. Any of these motions may be controlled by a suitably programmed control unit of the kind generally known in the art.

At the simplest, the shape of the elongate electrode may be rectilinear, but this will not generate an aerofoil surface in a single pass. It is much preferred to curve the electrode, and a simple circular arc may suffice. The curve should be smooth. Sharp or abrupt changes in shape are generally to be avoided, to minimize stress concentrations in the formed blades, and to promote the desired airflow over them.

The dimensions of the electrode can be described as length, width and depth. Being elongate, the width and depth are small relative to the length, which extends across the thickness of the edge of the workpiece to form the groove. The width of the electrode corresponds to the width of the groove as it is being formed at any instant, less the proximity gaps between the electrode and each side of the groove where the erosion of the workpiece material is taking place. The depth of the electrode refers to the dimension in the direction of normal advance towards the workpiece. The width and depth are desirably as small as conveniently possible, while maintaining the electrode substantially rigid, and allowing other desired properties to be maintained, such as electrical conductance. It should be understood that, provided the electrode is not advanced faster than the erosion rate of the workpiece, there should be no physical contact with the workpiece, and therefore minimal forces tending to distort the electrode, so high accuracy can be maintained with relatively weak electrode structures and mountings.

The leading edge of the electrode is most suitably rounded. This gives the positive benefit of generating a rounded root at the base of each blade, at each side thereof, at the bottom of each groove. This is highly desirable to avoid stress concentrations and promote a long service life.

The width of the electrode defines the minimum spacing between adjacent blades. As the desired spacing increases, a second pass of the electrode into the blank broadens the groove; as the desired spacing increases further, a new groove will need to be cut, in which case unwanted workpiece material between the grooves needs to be removed by suitable means to give clear space between adjacent blades. Suitable means can include means for moving the tool holder sideways, or for moving the workpiece sideways, to use the elongate non-wire electrode to cut a lateral groove joining the bases of two adjacent radial grooves and remove the unwanted material in one piece.

Considering the width of the electrode, that is to say the short dimension across the elongate form when viewed in the direction of advance into the blank, the inner radius of the curve defines the outer curve of the blades, while the outer radius of the curve defines the inner curve of the blades. Because a shaped curved electrode has a real thickness, the inner edge of the curve has a smaller radius than the outer edge, if the electrode is of uniform width in that region. Accordingly, the same curved uniform width electrode can be used to form both sides of the blades into a curved aerofoil section, having thin opposite side edges and a thicker centre portion, in a long and narrow crescent shape, with a flatter inner surface and a more curved outer surface. However, it is usually preferable to use different radius curves for the inner and outer faces of the blades in order to achieve the correct aerofoil shape and cross section. The thickest part of the section is preferably towards the leading edge of each blade.

The curve need not be limited to the form of the electrode when viewed in the direction of advance into the blank, ie when viewing its width. The electrode may be curved when viewing its depth, ie when seen from the side. This allows the finished groove to be deeper at some parts than at others. The root of the groove may thus be formed curved.

A non-wire electrode can be formed with a cross sectional shape, or area, or both, that varies along its length, according to the desired groove shape. Different shapes may be formed at different locations along its length. The electrode may have projections or indentations to any degree. The electrode may even be apertured, to form a groove with an upstanding projection of uneroded material.

Although the elongate electrode may normally extend wholly across the edge of the blank, and be supported at two ends on either side of the blank, in some circumstances it may extend only partially across the blank. The resulting groove, at least as far as results from a single pass of the electrode, may then be formed in one side only of the blank, that being the side from which the electrode penetrates. Such an electrode may terminate, within the groove, in a recess, which may be a shallow concavity or a deeper fork, or a projecting nib, or any other desired shape.

The elongated non-wire electrodes used in the present invention may be formed in any manner that is appropriate to their composition, which may be, for example, graphite, copper, tungsten, or any other metallic or non-metallic material suitable to the erosion method and workpiece material used. Suitable manufacturing methods include casting, forging, pressing, and machining from solid.

As the elongate electrode advances, in its holder, along the length of a blade, defining that surface of the blade, a twist is generated in the blade by slowly rotating the holder. It would be most unusual for a twist of more than 90° to be required. Rotation of the holder may be achieved by any suitable means, from a mechanical guide, of the kind illustrated in FIGS. 1 and 2 of the accompanying drawings, to electrical or electronic means, using stepper motors or programmable twist controls or in any other way.

BRIEF DESCRIPTION OF THE DRAWINGS

Other objects, features, and advantages of the present invention will become more apparent from the following detailed description of the preferred embodiments and certain modifications thereof when taken together with the accompanying drawings in which:

FIGS. 5a, 5b and 5c show respectively plan, elevational and cross-sectional views of the electrode illustrated in FIGS. 3 and 4;

FIGS. 6a, 6b and 6c show similar views of an alternative shaped electrode;

FIGS. 7a, 7b and 7c show similar views of an alternative shaped electrode;

DETAILED DESCRIPTION OF THE PREFERRED EMBODIMENTS

Figure 1:
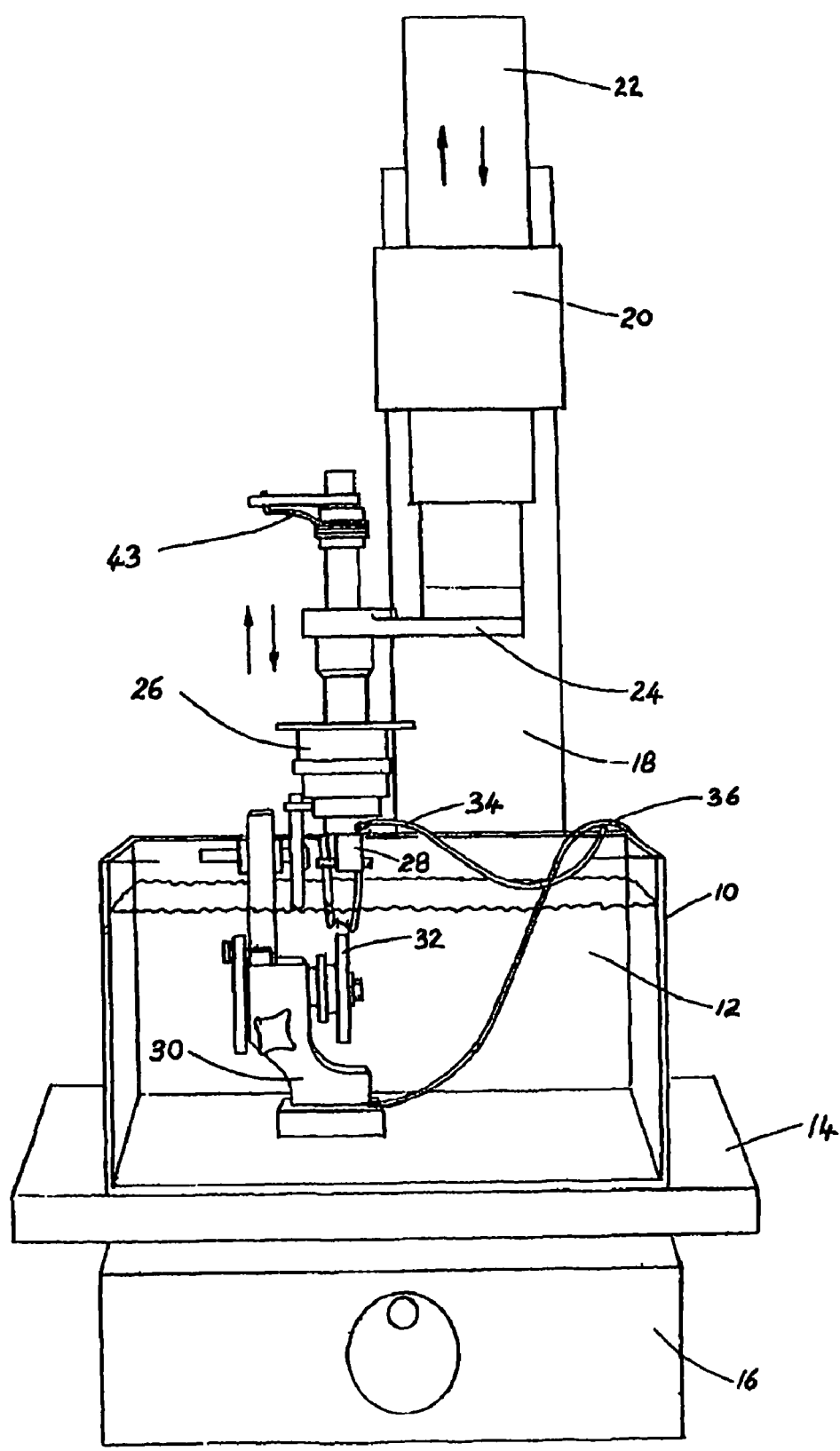
FIG. 1 is a perspective illustration of spark erosion apparatus for forming a turbine disc described in WO2004/076111.

Referring first to FIG. 1, the illustrated apparatus comprises a tank 10 containing a suitable liquid quenching medium 12, which is a dielectric fluid such as a suitable paraffin oil or water based alternative, in which to conduct spark erosion operations. The tank is supported by a platform 14, under which is a housing 16 for the necessary electrical and control equipment, which is of any kind that is in itself known in the art.

Behind tank 10, as shown, is a pillar 18. Towards its upper end the pillar carries a hydraulic drive 20, which moves a drive column 22 up and down under the control of the equipment in housing 16. An electronic servo drive may be an acceptable alternative. The lower end of the drive column carries a horizontal support arm 24, which carries tool holder head 26, to be described in more detail in relation to FIG. 2. The tool holder head carries tool holder 28.

Within tank 10, immersed in the liquid 12, is a pedestal 30, which carries a workpiece 32 vertically below the tool holder 28. FIG. 1 shows a positive electrical conductor cable 34 extending from the tool holder, and a negative or earth electrical conductor cable 36 extending from the pedestal, both leading to an electrical power source in housing 16. This power source is of the usual kind for spark erosion.

Figure 2:
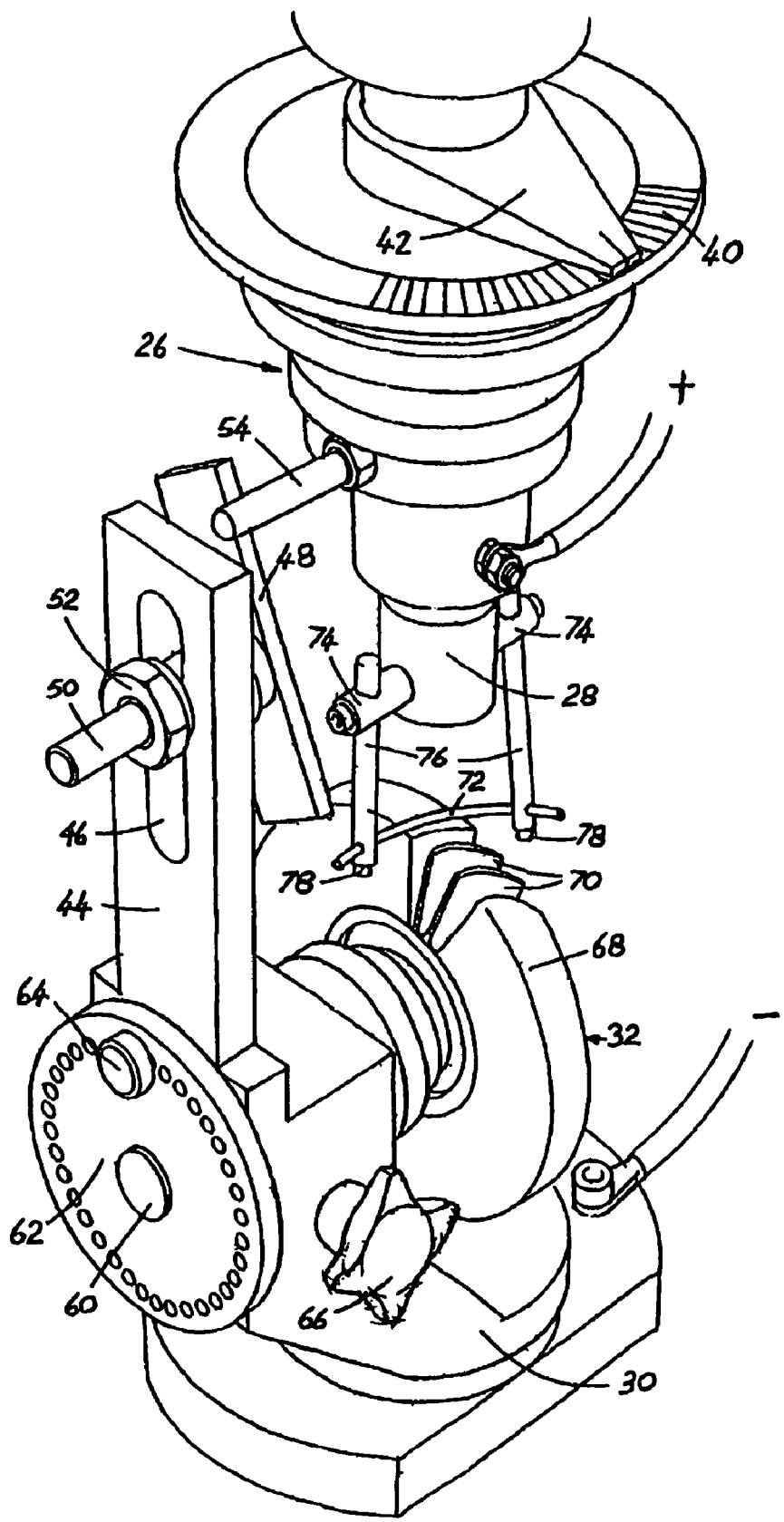
FIG. 2 is a perspective illustration of part of the apparatus shown in FIG. 1, from a different and closer viewpoint, also described in WO2004/076111.

FIG. 2 shows more detail of the tool holder and pedestal.

The tool holder head 26 includes a rotation scale 40 and rotation scale pointer 42, to indicate the angular displacement of the actual tool holder 28, under the rotation scale, about a vertical axis, in relation to an arbitrary zero. This is possible because the tool holder can be turned about this axis, by the application of an external force, and against the resistance of an external adjustable tension return spring 43 (FIG. 1), away from a stop towards which the spring constantly urges it. The zero position of rotation may be taken to be the position of the tool holder against that stop.

The pedestal is surmounted by a guide support column 44, in which is formed a vertical slot 46. A guide ramp 48 is mounted on the head of a ramp mounting bolt 50 which passes through slot 46 and is clamped at a chosen position therein by nut 52. In clamping the ramp mounting bolt, the operator sets not only the height of the ramp, but also its angle.

Guide ramp 48 is made of a low friction, electrically insulating material, such as a polyamide polymer.

Tool holder 28 is provided with a laterally extending guide pin 54 which is located so that, if tool holder head 26 is lowered by the action of hydraulic drive 20 towards workpiece 32, the guide pin engages the top surface of the guide ramp and starts to turn the tool holder against the action of its return spring, to a degree indicated by scale pointer 42 over rotation scale 40. If the tool holder head is then raised by drive 20, the action of the return spring keeps the guide pin in contact with the ramp surface, so that all motion is exactly reversed. It will be understood that the relation between the rotation of the tool holder and the advance of the tool holder is controlled entirely by the profile, height and inclination of the surface of guide ramp 48 which governs the motion of guide pin 54.

Workpiece 32 is mounted on pedestal 30 in a rotary manner on a spindle 60 on a horizontal indexing axis; its rotational position is controlled manually by indexing wheel 62, the various indexing positions being selected by indexing peg 64, the whole being manually lockable by indexing clamp 66. In production applications, an electronic automatic indexing control coupled to the spark erosion control equipment in housing 16 (FIG. 1) may conveniently be used in place of the manual indexing wheel 62, peg 64 and clamp 66.

In this illustrated embodiment, the workpiece is a disc, suitable for forming into a turbine disc with radial blades around a central hub. The disc has an edge surface 68, into which grooves are formed as described below, to form the blades, two of which are shown for illustrative purposes at 70.

In order to form the grooves, the tool holder carries a curved wire tool electrode 72. This is mounted on the tool holder in a universal mounting comprising two diametrically opposed adjustable wire holder clamps 74, each determining the position and orientation of a respective wire holder arm 76. The electrode wire itself passes through a hole in the lower end of each holder arm, in each of which it is clamped by a screw 78 at a selected rotational orientation and a selected position along its curved length.

It will be appreciated that the wire is thus mounted in the tool holder above the workpiece disc, lying across the disc edge at a precisely chosen position and orientation, with a specific curve presented towards the workpiece, immersed in a quenching liquid, ready for electro-discharge machining of the turbine blades to begin. The process proceeds, and the apparatus functions, as set out in the preceding general and specific descriptions in this specification.

In this example, the workpiece is aluminum alloy, with a diameter of 76 mm and an edge thickness of 4 mm. The wire is pure copper, with a diameter of 1.6 mm. Satisfactory erosion rates of 2 mm/min are achievable, even in an experimental rig, at a current of 3 amps and voltage of 80 volts. The rate of advance of the hydraulic drive, and electrical current on/off switching, is controlled by the usual equipment, contained in housing 16. The rate of erosion of material from the workpiece depends on the current flowing, which is limited by the wire size.

Although FIG. 2 shows two blades 70 already formed, in practice it may be found more convenient to set up the electrode wire to form one surface of each blade, either the inner or the outer surface, at the positions determined by the allowed positions of the indexing wheel, before offsetting and adjusting the position of the electrode wire, by means of the adjustable wire holder clamps and the wire holder arms, to form the other surface of each blade at the same indexing positions. If necessary, any remaining attached portions of the workpiece disc 32 between adjacent blades 70 are finally removed.

The foregoing description of the use of a wire electrode can be applied directly to the method, process and apparatus of the present invention by substituting an elongate and substantially rigid non-wire electrode for the wire electrode described.

Figure 3:
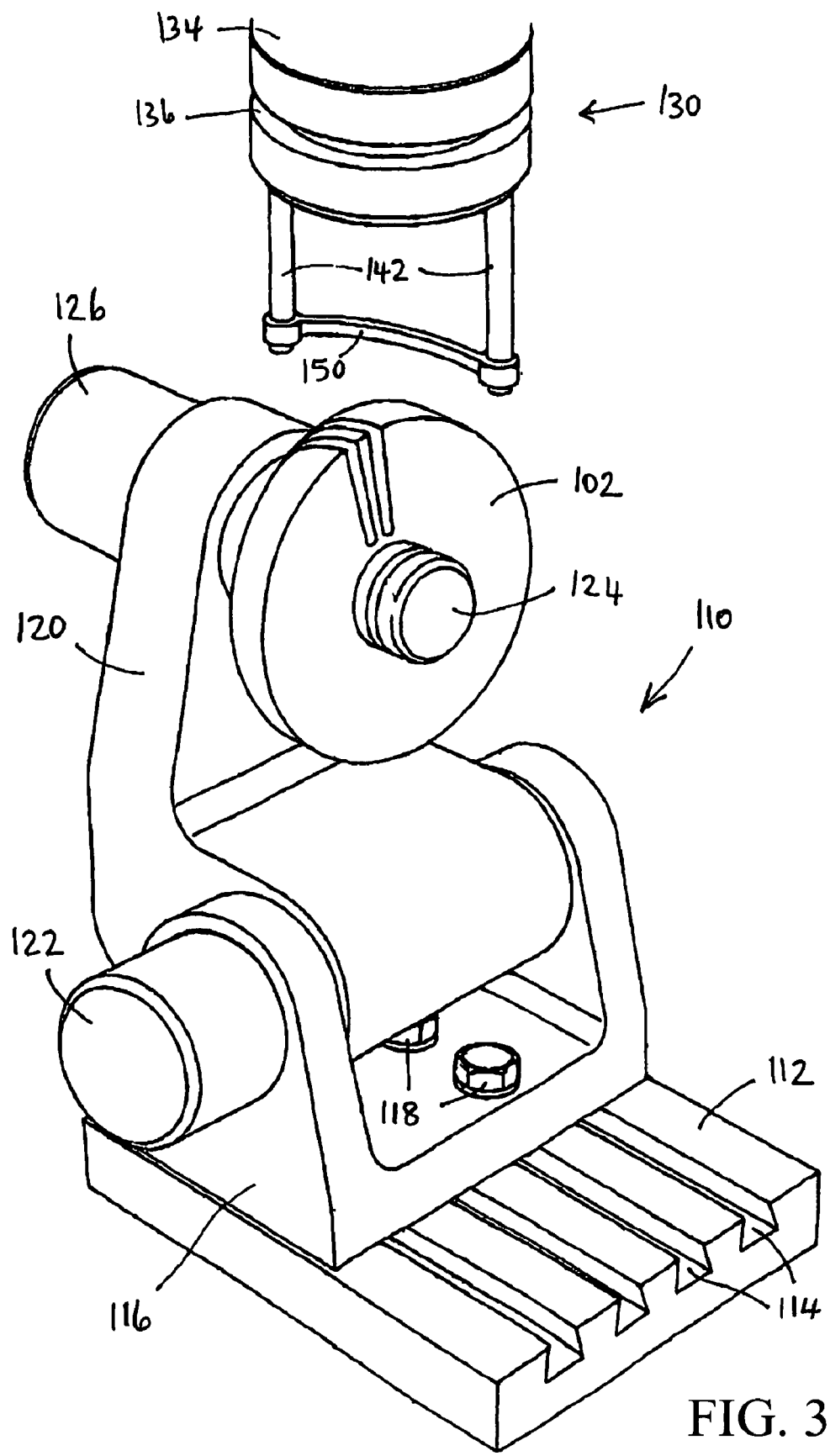
FIG. 3 is a perspective illustration of further spark erosion apparatus also for forming a turbine disc, using a different tool electrode.

The apparatus shown in FIG. 3 is a more fully automated version of the spark erosion apparatus shown in FIGS. 1 and 2, and operates in essentially the same environment to form a turbine disc from a workpiece 102. The workpiece is however mounted in a rotary indexing unit 110 comprising a bed 112 with dovetail grooves 114 in which a slidable base 116 is clamped in a desired position by bolts 118. The base carries a tilting pedestal 120 whose rotation about a first horizontal axis is driven and controlled by a first rotary encoder and stepper motor 122. Pedestal 120 in turn carries a spindle 124 lying on a second axis perpendicular to, but in a plane offset from, the first axis. Spindle 124 is turned and controlled by a second rotary encoder and stepper motor 126, and mounts workpiece 102.

The first stepper motor 122 enables the second axis to be tilted to the necessary accurate angle to enable the correct blade root angle to be achieved in that plane. The second stepper motor 126 ensures correct rotary indexing of the workpiece to suit the number and face locations of the equally spaced blades to be formed.

Figure 4:
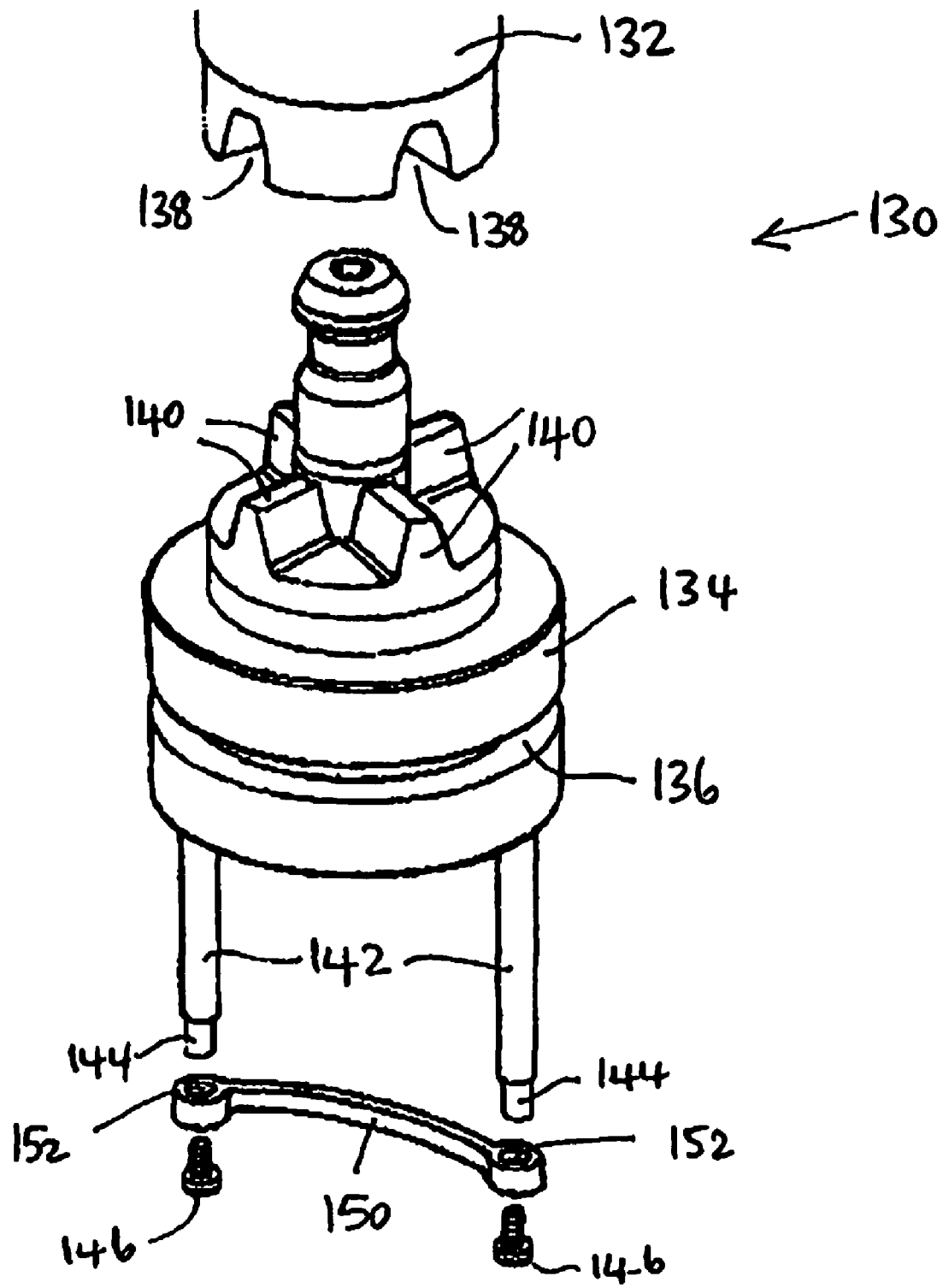
FIG. 4 shows an exploded view of the electrode holder illustrated in FIG. 3.

The electrode holder 130 is shown in both FIG. 3 and FIG. 4. It comprises a permanent head 132 (FIG. 4) and a changeable head 134, which has a circumferential groove 136 by which it is handled by automatic tool-changing machinery in a manner known in the art. Permanent head 132 is provided with locating recesses 138 engageable by corresponding shoulders 140 in the changeable head 134. The changeable head carries two spaced apart downwardly projecting posts 142, terminating in shoulders 144, for engaging eyes 152 at either end of the elongate tool portion of electrode 150, shown in more detail in FIG. 5. Set screws 146 fix the electrode on the posts.

The permanent head 132 incorporates a stepper motor that turns the head, including the changeable head 134 carrying the electrode, by rotation on a vertical axis, as the tool advances (or retracts) vertically to give the desired twist to the blades. All motions are CNC controlled. Retraction retraces the original forward path.

A plurality of changeable heads 134 are stored on a carousel (not shown) with appropriate electrodes ready mounted on each. This enables the tool electrodes to be replaced when desired, automatically.

Figure 14:
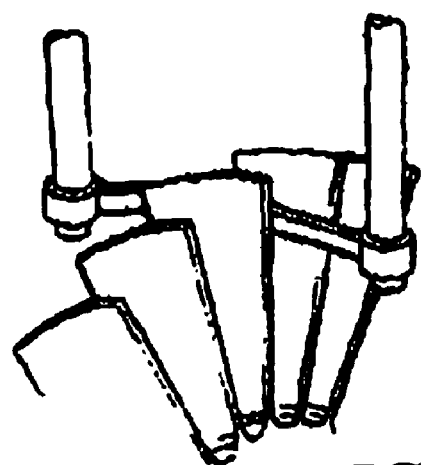
FIG. 14 is a partial perspective view showing the use of the electrode of FIG. 5.

The working tool portion of electrode 150 (FIG. 5), between the eyes 152 by which it is mounted on a changeable head 134, is of a modified rectangular cross section, with the two leading lower edges rounded. It is curved in plan, but straight in side elevation. Its use is illustrated in FIG. 14.

The electrode 160 (FIG. 6) is similar, but straight in plan.

Figure 17:
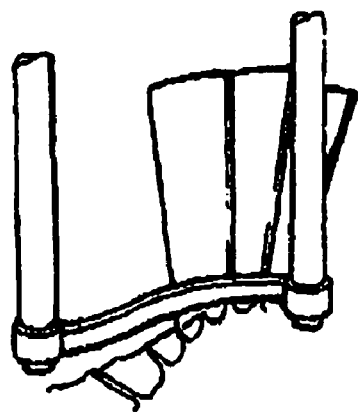
FIG. 17 is a partial perspective view showing the use of the electrode of FIG. 7.

The electrode 170 (FIG. 7) is similar, straight in plan, but recurved in side elevation. Its use is illustrated in FIG. 17.

Figure 8A:
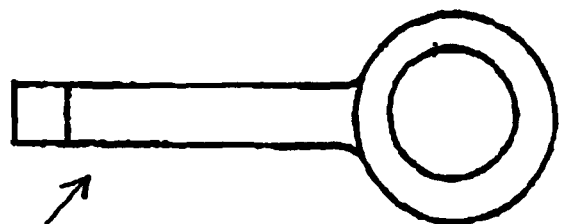
FIGS. 8a, 8b and 8c show respectively plan, elevational and end views of an alternative shaped electrode.
Figure 8C:
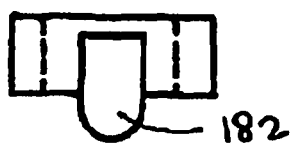
Figure 8B:
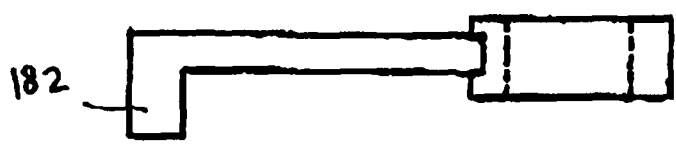
Figure 16:
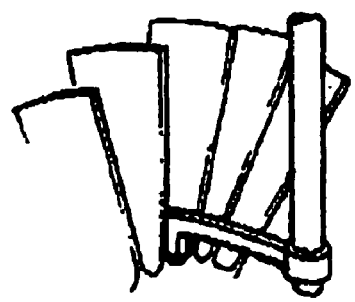
FIG. 16 is a partial perspective view showing the use of the electrode of FIG. 8.

The electrode 180 (FIG. 8) is to be mounted on only one post 142 and terminates in a downward nib 182, with a semi-cylindrical lower profile. It can be used to clean up the root section of the workpiece between adjacent blades, as shown in FIG. 16.

Figure 9A:
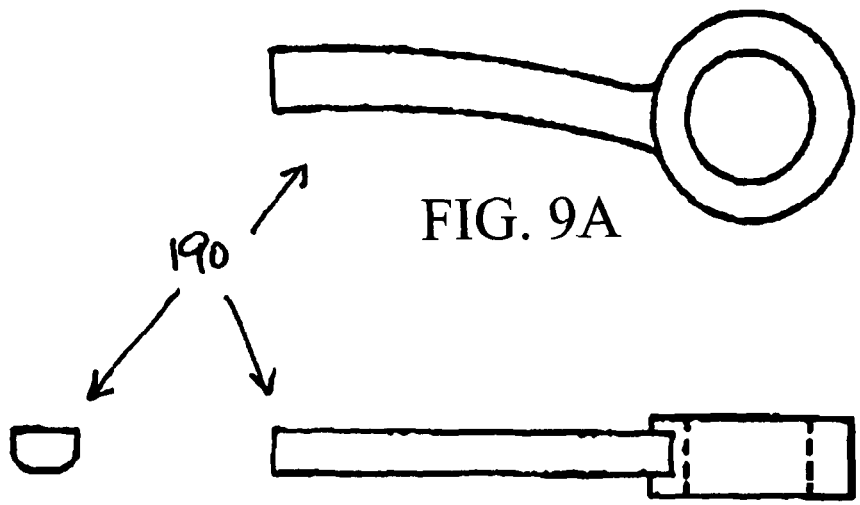
FIGS. 9a, 9b and 9c show respectively plan, elevational and cross-sectional views of an alternative shaped electrode.
Figure 9C:
Figure 9B:
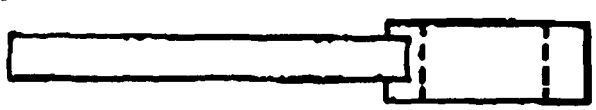
Figure 12:
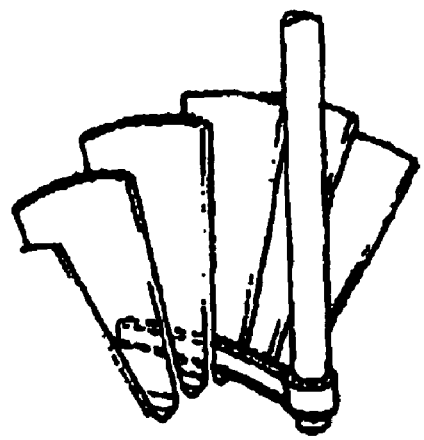
FIG. 12 is a partial perspective view showing the use of the electrode of FIG. 9.

The electrode 190 (FIG. 9) corresponds to one end only of electrode 150, and is to be mounted on only one post 142. Its use is illustrated in FIG. 12.

Figure 10A:
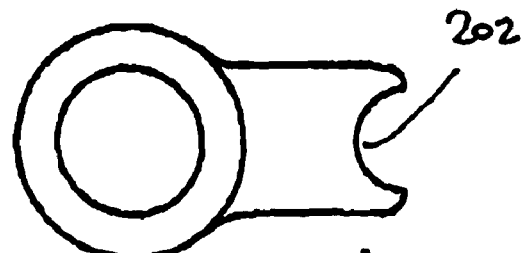
FIGS. 10a, 10b and 10c show respectively plan, elevational and end views of an alternative shaped electrode.
Figure 10B:
Figure 10C:
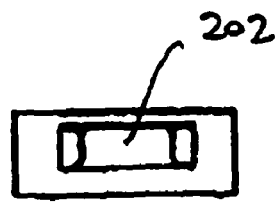
Figure 15:
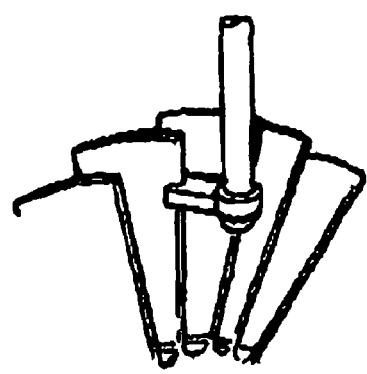
FIG. 15 is a partial perspective view showing the use of the electrode of FIG. 10.

The electrode 200 (FIG. 10) is to be mounted on only one post 142 and terminates in a concave, nearly semicircular recess 202. It is used to machine the leading edge profile of a blade, as shown in FIG. 15.

Figure 11A:
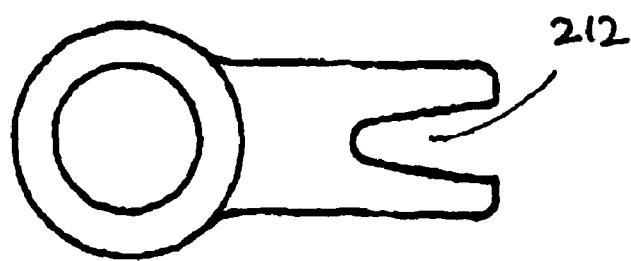
FIGS. 11a, 11b and 11c show similar views of an alternative shaped electrode.
Figure 11B:
Figure 11C:
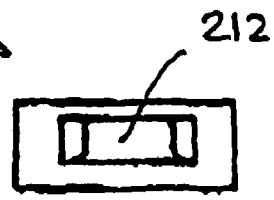
Figure 13:
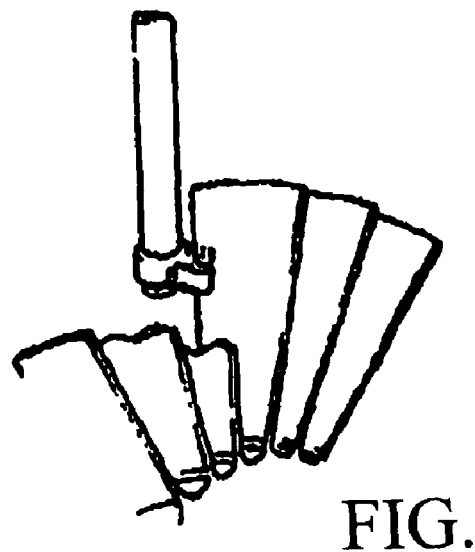
FIG. 13 is a partial perspective view showing the use of the electrode of FIG. 11.

The electrode 210 (FIG. 11) is also to be mounted on one post 142. It terminates in a deeper fork 212, with a rounded internal apex. It is used to machine the trailing edge profile of a blade, as shown in FIG. 13.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:

1. A method of forming a closely spaced radial array of overlapping airfoils for use in an axial compressor or turbine in a gas turbine engine from a solid planar blank of material having a perimeter edge, each airfoil comprising a concave pressure side and opposed convex suction side extending axially between opposing side edges and twisted lengthwise, comprising:
   providing a cutting tool in the form of an elongate and substantially rigid element other than a wire,
   providing a tool holder comprising at least one post entirely outside the plane of said planar blank for fixedly engaging said cutting tool in an orientation in which at least a portion of said cutting tool intersects said plane of said blank, said tool holder disposed to advance in a direction parallel to said plane of said workpiece so as to advance said cutting tool towards and past said perimeter edge,
   removing material from said a solid blank to leave the blades or vanes upstanding as the residual material of the blank, removal being effected by a change of state of the material induced by proximity to said advancing tool, and the tool turning as it advances, whereby to generate a surface of said shaped blade or vane.

2. A method according to claim 1, wherein the removal is effected by electro-discharge machining using a turning non-wire tool electrode.

3. The method of claim 1, wherein the elongate and substantially rigid non-wire cutting tool is curved in plan view, seen in the direction of advance of said cutting tool, and straight in side elevation.

4. A process for forming, in the body of a planar workpiece blank having a perimeter edge and a thickness across a surface of said edge, a row of twisted aerofoil blades extending towards said edge, each airfoil blade comprising a concave pressure side and opposed convex suction side extending axially between opposing side edges and twisted lengthwise, the method comprising:
   providing a tool holder for fixedly engaging an electrode, said tool holder adapted to engage said electrode solely at one or more points outside said thickness of the plane of said workpiece;
   holding a shaped non-wire electrode in a said holder,
   positioning the holder to orient the electrode across the thickness of the edge surface,
   advancing the electrode towards the edge surface of the blank,
   causing a high tension discharge between the wire electrode and the work piece blank whereby to erode portions of the workpiece ahead of the electrode and thereby form a first groove across the edge of the blank,
   advancing the tool holder past said perimeter but outside said plane of said workpiece such that only said electrode enters into the groove to deepen the first groove, and
   turning the tool holder during said advance to give the first groove a helical form; and
   forming second and further similar adjacent grooves in the workpiece blank in a similar manner whereby the residual workpiece body between pairs of adjacent grooves has the form of a twisted aerofoil blade.

5. The process of claim 4, wherein the shaped non-wire electrode is curved in plan view, seen in the direction of advance of the electrode, and straight in side elevation.

6. A process according to claim 4, wherein adjacent blades are closely spaced, and overlap when viewed in the direction of advance of the tool.

7. A process according to claim 4, wherein said planar workpiece blank is a disk-like workpiece having a thickness across a circumferential perimeter edge surface, comprising forming a hub carrying a plurality of radial twisted aerofoil blades, by advancing the tool holder radially inwardly when forming each groove.

8. A process according to claim 7, wherein the blades thus formed overlap when viewed radially of the hub, and also when viewed axially of the hub.

9. Apparatus for forming a closely spaced array of overlapping shaped twisted airfoil blades in a planar workpiece blank, each airfoil blade comprising a concave pressure side and opposed convex suction side extending axially between opposing side edges and twisted lengthwise, comprising a shaped non-wire tool to remove material from said workpiece blank by a change of state of the material induced by proximity to the tool as it is advanced into said workpiece, whereby to leave blades or vanes upstanding as the residual material of the blank, and means for engaging said tool only outside of the plane of said planar workpiece at one or more points and means for advancing said tool towards said workpiece such that said tool enters said workpiece while said engagement means do not enter said workpiece, and means for turning the tool as it advances, whereby to generate a surface of a said shaped blade or vane.

10. The apparatus according to claim 9, wherein the shaped non-wire tool is curved in plan view, seen in the direction of advance of said tool, and straight in side elevation.

11. Apparatus according to claim 9, wherein the shaped non-wire tool is an electro-discharge machining electrode.

12. Apparatus for forming, in the body of a disk-like planar workpiece blank having a circular perimeter edge and a thickness across a surface of said edge, a row of twisted aerofoil blades extending towards the said edge, each airfoil blade comprising a concave pressure side and opposed convex suction side extending axially between opposing side edges and twisted lengthwise, comprising an elongate shaped non-wire electrode held in a holder, said holder comprising at least one post outside the plane of said planar blank for fixedly engaging said electrode in an orientation in which the elongate electrode is positioned across at least a portion of the thickness of said plane of said workpiece blank and beyond the perimeter edge surface, means for causing a high tension discharge between the electrode and the workpiece blank whereby to erode portions of the workpiece ahead of the electrode and thereby form a first groove across the edge of the blank, means for advancing the electrode holder in a radial direction parallel to the plane of the workpiece blank whereby only the electrode is advanced into the groove in a radial direction to deepen the first groove, and means for turning the tool holder during said advance to give the first groove a helical form.

13. Apparatus according to claim 12, further comprising indexing means for indexing the workpiece blank through a sequence of positions at which successive deep helical grooves may be formed by the electrode.

14. Apparatus according to claim 12, comprising means for retracting the electrode holder along its advancement path in order to withdraw said electrode from each formed groove.

15. Apparatus according to claim 12, comprising means for moving the workpiece or the electrode holder laterally during advance of the electrode into the groove, so that the groove is formed at a slight incline.

16. Apparatus according to claim 12, comprising:
means for tilting the workpiece or the electrode holder, whereby to adjust the inclination of the groove.

17. Apparatus according to claim 12, wherein the shaped electrode is curved in an arc about one or more axis parallel to said direction of advancement of said electrode.

18. Apparatus according to claim 17, wherein said arc comprises an inner radius and an outer radius, wherein said inner radius of the curved electrode defines an outer curve of the blades, and said outer radius of the curved electrode defines an inner curve of the blades.

19. Apparatus according to claim 18, wherein the inner curve of the blades is flatter than the outer curve, so that the aerofoil section of the blades has thin opposite side edges and a thicker centre portion.

20. Apparatus according to claim 12, wherein the leading edge of the electrode, in the direction of normal advance towards the workpiece, is rounded.

21. Apparatus according to claim 12, comprising means for moving the electrode holder sideways, or for moving the workpiece sideways, to use the electrode to cut a lateral groove joining the bases of two adjacent radial grooves and remove the material between them in one piece.

22. Apparatus according to claim 12, wherein the elongate non-wire electrode has a modified rectangular cross section, with leading edges rounded.

23. Apparatus according to claim 12, wherein the elongate non-wire electrode is curved in plan view, seen in the direction of advance of the electrode, and straight in side elevation.

24. Apparatus according to claim 12, wherein the elongate non-wire electrode is straight in plan view, seen in the direction of advance of the electrode, and straight in side elevation.

25. Apparatus according to claim 12, wherein the elongate non-wire electrode is straight in plan view, seen in the direction of advance of the electrode, and recurved in side elevation.

26. Apparatus according to claim 12, wherein the elongate non-wire electrode is provided with a projection in the form of a nib.

27. Apparatus according to claim 12, wherein the elongate non-wire electrode terminates in a recess.

* * * * *